Aug. 14, 1962    W. KNECHT ETAL    3,049,084
ROTARY DOUGH KNEADING MACHINE
Filed April 26, 1960    2 Sheets-Sheet 1

INVENTORS
WERNER KNECHT
MAXIMILIAN STÜDLEIN

By Hane and Kydick
ATTORNEYS

INVENTORS
WERNER KNECHT
MAXIMILIAN STÜDLEIN

BY Haanes and Nydick
ATTORNEYS

United States Patent Office 3,049,084
Patented Aug. 14, 1962

3,049,084
ROTARY DOUGH KNEADING MACHINE
Werner Knecht, Korntal, near Stuttgart, and Maximilian Stüdlein, Stuttgart, Germany, assignors, by mesne assignments, to Werner & Pfleiderer G.m.b.H., Zug, Switzerland, a firm of Switzerland
Filed Apr. 26, 1960, Ser. No. 24,844
Claims priority, application Germany June 13, 1959
4 Claims. (Cl. 107—9)

The invention relates to a device for rotary kneading of dough, and more particularly to a kneading machine of the kind comprising an outer drum having transverse apertures in its wall, an inner kneading drum disposed coaxially with the outer drum and a conveyor encompassing part of the lower circumference of the outer drum. The conveyor participates in the kneading operation and also serves as transport conveyor for kneaded pieces of dough.

Rotary dough kneading devices of this kind as heretofore known are not satisfactory as to the transport of the pieces of dough after leaving the kneading cells formed by the apertures in the outer drum. The pieces of dough when transferred from the cells to the conveyor portion serving to transport the dough pieces, have a certain inertia movement due to the motion imparted to the same by the action of the inner drum. As a result, the pieces of dough will be deposited upon the conveyor with a more or less irregular transverse spacing. However, it is desirable that the pieces of dough are transported uniformly spaced, especially when the kneading device constitutes a station in a backing installation operating in a continuing flow.

Accordingly, it is a broad object of the invention to provide means by which a uniform transverse spacing of the discharged pieces of dough is attained in a very simple and comparatively inexpensive manner.

The concept of the invention resides in forming in the conveyor portion which serves to carry away the pieces of dough, longitudinal grooves which receive the pieces of dough and thus automatically locate the same in uniformly spaced rows. These locating grooves are present in the conveyor only temporarily and while the same serves as transport conveyor. They may be formed by providing in the guide means for the conveyor gaps extending transversely to the direction of movement of the conveyor. A similar result may be obtained by providing on the back side of the transport portion of the conveyor strips or ribs which engage the conveyor and form temporary grooves in the same.

Other and further objects, features and advantages of the invention will be pointed out hereinafter and set forth in the appended claims constituting part of the application.

In the accompanying drawing several preferred embodiments of the invention are shown by way of illustration and not by way of limitation.

Figure 1:
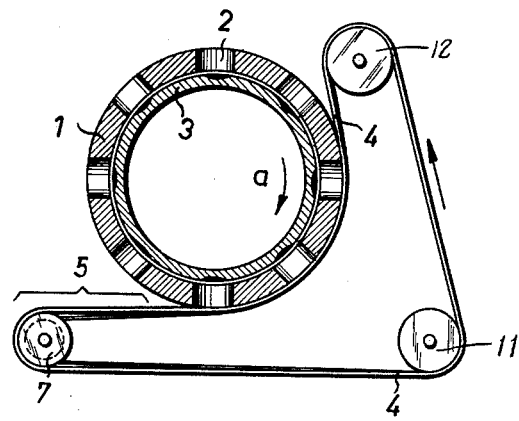
FIG. 1 is a diagrammatic sectional view of a rotary kneading device according to the invention.
Figure 2:
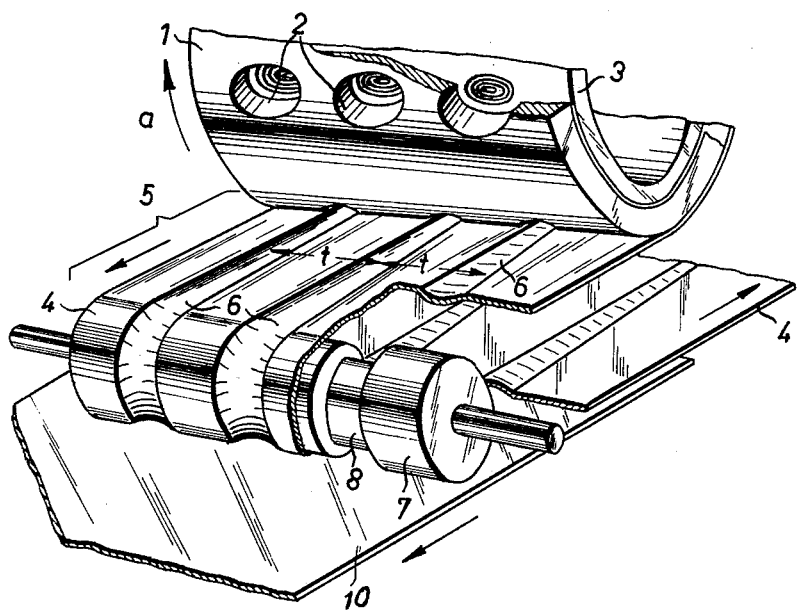
FIG. 2 is a perspective fragmentary view showing the essential features of the invention on an enlarged scale.

Referring first to FIG. 1 in detail, this figure shows only those parts of the device that are essential for the understanding of the invention. According to FIG. 1, the kneading device comprises a rotary outer drum 1 having in its wall apertures 2 which constitute kneading cells. An inner drum 3 which constitutes the kneading drum, is disposed within drum 1 coaxially therewith. Both drums are rotated in the direction of arrow "a," and in addition the inner drum performs in reference to the outer drum a motion in rotational direction and also an axially reciprocatory motion. The relative motions of the drums effect the desired rotary kneading. The control of the drum motions and the kneading operation as such are well known in the art and do not constitute part of the invention. Part of the lower circumference of the outer drum is encompassed by a band conveyor 4. The conveyor while in engagement with the drum prevents pieces of dough from prematurely falling out of cells 2 while being kneaded. The conveyor is an endless flexible band conveyor and is guided over pulleys 7, 11 and 12 so as to travel under tension along the path shown in FIG. 1. As can be seen in this figure, the conveyor travels along a plane path 5 after leaving drum 1 and this plane path constitutes the transport portion of the conveyor. The pulley 7 at the end of the path 5 reverses the direction of the conveyor travel so that pieces of dough deposited upon the conveyor by gravity as soon as a cell 2 is clear of the conveyor will be discharged upon another conveyor 10 (see FIG. 2) for further treatment.

In order to assure that the pieces of dough which fall out of the cells 2 after the same are uncovered by conveyor 4, are deposited with uniform spacings "t" on conveyor portion 5, appropriately spaced longitudinal grooves 6 are formed in the conveyor as the same travel along path 5. As is evident, pieces of dough which fall into grooves 6 cannot be laterally dislodged thereby assuring uniformity of the transverse distribution of the pieces of dough which is most important.

The grooves are formed by providing in pulley 7 circumferential grooves 8. The spacing and number of the gaps formed by grooves 8 correspond to the spacing and number of rows of cells 2, three in the example shown, and each row of cells and the corresponding groove are disposed in a common vertical plane.

Due to the flexibility of conveyor 4 and its tension, the gaps formed by grooves 8 in pulley 7 will automatically compel the portions of conveyor 4 approaching the interrupted pulley 7 to form the guide grooves 6. Equally automatically, the grooves 6 will gradually flatten themselves as the conveyor leaves pulley 7 and approaches pulley 11.

Figure 3:
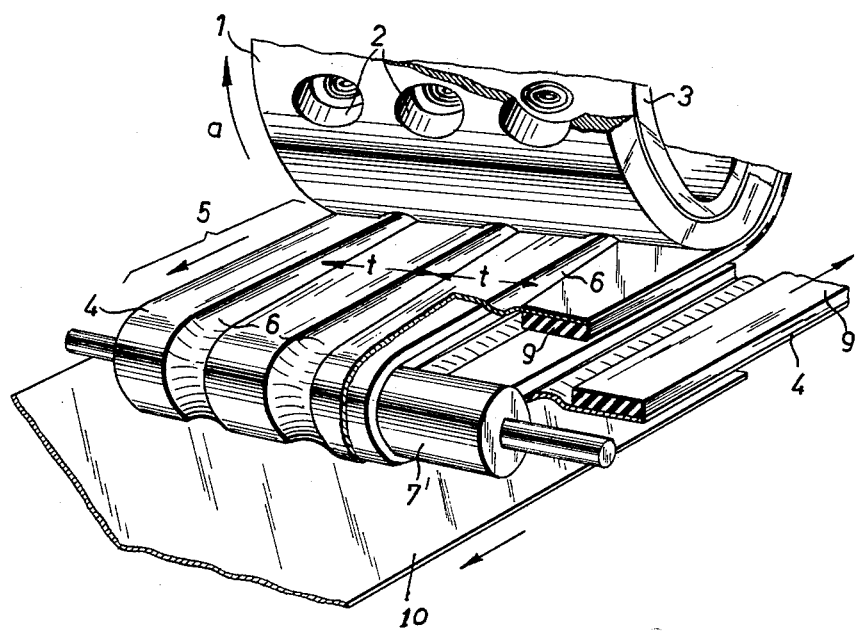
FIG. 3 is a view similar to FIG. 2 and showing a modification of the essential features according to the invention.

According to FIG. 3, grooves 6 are formed by mounting between a smooth pulley 7' and drum 1 contouring ribs or strips 9. These ribs are located beneath the conveyor portions as they travel through path 5 and in engagement therewith. The ribs are transversely spaced in accordance with the axial spacing of cells 2 and as a result, guide grooves 6 similar to those previously described are formed.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. In a device for subjecting dough to a rotary kneading action of the kind including an outer rotary drum having in its wall rows of circumferentially and transversely spaced apertures constituting kneading cells, an inner rotary drum disposed coaxially with the outer drum and coacting with the same to subject portions of dough placed in said cells to a rotary kneading action and a conveyor encompassing a lower part of the circumference of the outer drum to cover cells in said part of the circumference and continued in a transport path to receive for transport kneaded dough portions falling out of cells uncovered by the conveyor as the same separates from the outer drum, said dough portions being discharged from the conveyor at the end of said transport path, the improvement of the conveyor comprising a flexible flat conveyor band, guide and support means for the conveyor band to guide the same under tension along a plane transport path located beneath the drum and to form longitudinal grooves in the conveyor band portion traveling in said plane transport path, each of said grooves being located in a common vertical plane with a row of cells to receive kneaded dough portions falling out of the cells, the conveyor band due to its flexibility gradually recovering its initial flat configuration after leaving said plane path.

2. In a device for subjecting dough to a rotary kneading action of the kind including an outer rotary drum having in its wall several circumferential parallel rows of transverse apertures constituting kneading cells, an inner rotary drum disposed coaxially with the outer drum and coacting with the same to subject portions of dough placed in said cells to a rotary kneading action and a conveyor encompassing a lower part of the circumference of the outer drum to cover cells in said part of the circumference and continuing in a transport path to receive for transport kneaded dough portions falling out of cells uncovered by the conveyor as the same separates from the outer drum, said dough portions being dislodged from the conveyor at the end of said transport path, the improvement of the conveyor comprising a flexible flat conveyor band, and a guide roller rotating about an axis parallel to the rotational axis of said drums and guiding said conveyor band to travel under tension along a plane transport path upon leaving the circumference of the outer drum, and shaping means coacting with the conveyor band portion traveling along said plane path to form in said portion longitudinal grooves each located beneath said outer drum and in a common vertical plane with a row of cells to receive kneaded dough portions falling out of the cells, the conveyor band due to its flexibility gradually recovering its initial flat configuration after leaving said plane transport path.

3. In a device for subjecting dough to a rotary kneading action of the kind including an outer rotary drum having in its wall several circumferential parallel rows of transverse apertures constituting kneading cells, an inner rotary drum disposed coaxially with the outer drum and coacting with the same to subject portions of dough placed in said cells to a rotary kneading action and a conveyor encompassing a lower part of the circumference of the outer drum to cover cells in said part of the circumference and continuing in a transport path to receive for transport kneaded dough portions falling out of cells uncovered by the conveyor as the same separates from the outer drum, said dough portions being discharged from the conveyor at the end of said transport path, the improvement of the conveyor comprising a flexible flat conveyor band, a guide and shaping roller rotatable about an axis parallel to the rotational axis of said drums and including circumferential grooves, said roller guiding said conveyor band for travel under tension along a plane transport path contiguous to the conveyor band leaving the circumference of the outer drum and disposed beneath said outer drum, said grooves in the roller causing the conveyor band when traveling along said plane path to form longitudinal grooves transversely spaced and each located is a common plane with a row of cells to receive kneaded dough portions falling out of the cells, the conveyor band due to its flexibility gradually recovering its initial flat configuration after leaving said plane path.

4. In a device for subjecting dough to a rotary kneading action of the kind including an outer rotary drum having in its wall several circumferential parallel rows of transverse apertures constituting kneading cells, an inner rotary drum disposed coaxially with the outer drum and coacting with the same to subject portions of dough placed in said cells to a rotary kneading action and a conveyor encompassing a lower part of the circumference of the outer drum to cover cells in said part of the circumference and continuing in a transport path to receive for transport kneaded dough portions falling out of cells uncovered by the conveyor as the same separates from the outer drum, said dough portions being discharged from the conveyor at the end of said transport path, the improvement of the conveyor comprising a flexible flat conveyor band, a guide roller rotatable about an axis parallel to a rotational axis, said drum guiding said conveyor band to travel under tension along a plane transport path contiguous to the conveyor band leaving the circumference of the outer drum and disposed beneath said outer drum, and several guide members abutting against the conveyor band as the same is traveling along said plane path, on the side of said conveyor band opposite to that receiving the kneaded portions to form longitudinal grooves in said conveyor band, said guide members being spaced transversely of the travel direction of the conveyor band to form each of said grooves in a common vertical plane with a row of cells so that kneaded dough portions falling out of the cells are received in said grooves, the conveyor band due to its flexibility gradually recovering its initial flat configuration after leaving said plane path.

References Cited in the file of this patent

UNITED STATES PATENTS

| | | |
|---|---|---|
| 883,370 | Wood | Mar. 31, 1908 |
| 1,169,472 | Embrey | Jan. 25, 1916 |
| 2,382,657 | Olgiati | Aug. 14, 1945 |
| 2,640,445 | Reget | June 2 1953 |

FOREIGN PATENTS

| | | |
|---|---|---|
| 394,489 | Great Britain | June 19, 1933 |
| 481,062 | Germany | Aug. 13, 1929 |

(Corresponding U.S. Patent 1,678,747, July 31, 1938)

OTHER REFERENCES

German application, 1,082,202, printed May 25, 1960.